Feb. 23, 1971   D. C. RINEHART ET AL   3,565,553
HERMETIC COMPRESSOR UNIT
Filed April 18, 1969
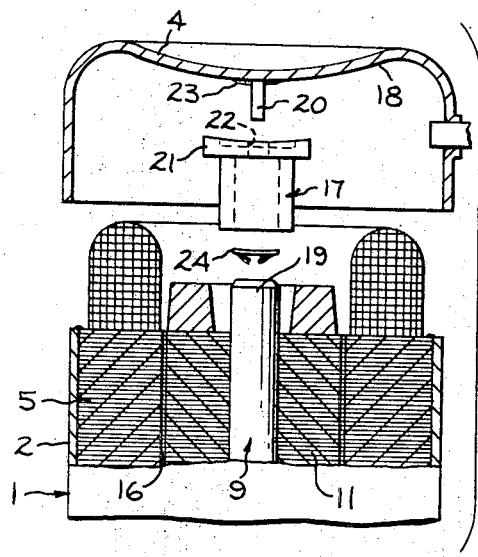
FIG.2
FIG.3
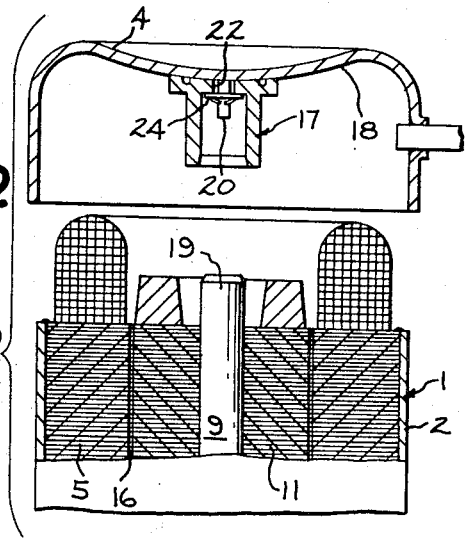
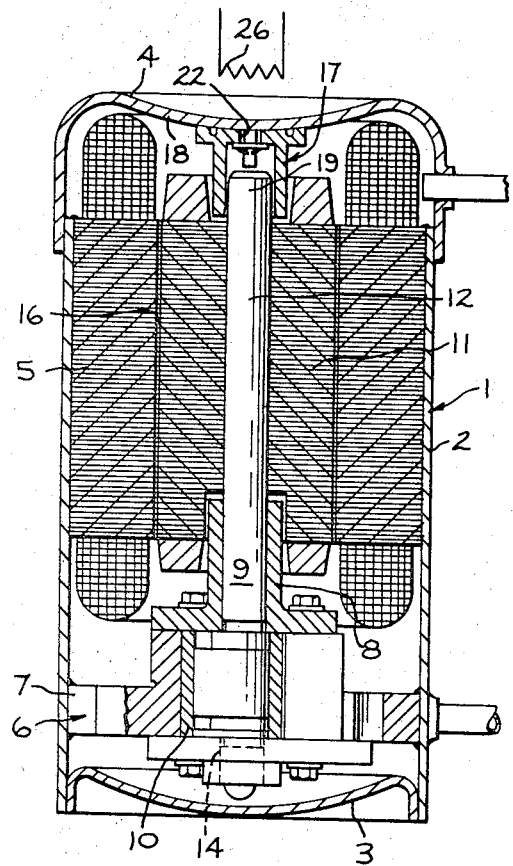
FIG.1
INVENTORS
DEAN C. RINEHART
& EMMETT G. GARDINER
BY
THEIR ATTORNEY

United States Patent Office 3,565,553
Patented Feb. 23, 1971

3,565,553
HERMETIC COMPRESSOR UNIT
Dean C. Rinehart and Emmett G. Gardiner, Louisville, Ky., assignors to General Electric Company, a corporation of New York
Filed Apr. 18, 1969, Ser. No. 817,471
Int. Cl. F04b 35/04
U.S. Cl. 417—424                              5 Claims

ABSTRACT OF THE DISCLOSURE

A hermetic compressor comprising a casing containing a motor-compressor unit rigidly supported within the casing and including a shaft having an overhanging end portion carrying the motor rotor is provided with bushing means on a casing end wall for limiting lateral movement of the end of the shaft.

BACKGROUND OF THE INVENTION

One type of hermetic compressor comprises a tubular casing containing a motor-compressor unit rigidly supported within the casing. The shaft connecting the motor rotor to the compressor is journalled in a main bearing between the motor and the compressor so that the portion of the shaft extending from the main bearing and carrying the motor rotor is overhung from the bearing. Unless the air gap between the stator and the rotor is completely concentric, the magnetic forces between the stator and the rotor are unbalanced resulting in a magnetic pullover force between the stator and the rotor in the direction of minimum air gap. This pullover force may cause a rubbing action between the interior of the stator and exterior of the rotor upon initial energization of the motor or, if the lack of eccentricity is extreme, may actually pull the rotor over against the stator with sufficient force to lock the motor. An obvious solution to this problem is to provide, in accordance with the usual motor practice, a second bearing at the opposite end of the motor. However, the addition of such a bearing not only adds to the material cost of the compressor, but also complicates and makes more expensive the assembly and mounting of the motor compressor unit within the casing since the added bearing must be concentric not only with the stator axis but also with the axis of the main bearing.

SUMMARY OF THE INVENTION

The present invention has as its primary object the provision in a hermetic motor compressor unit including an overhanging shaft portion carrying the motor rotor of low cost means for limiting magnetic pullover of the overhanging shaft portion. Another object of the invention is to provide an improved means and method of assembling a compressor of the above type including means for limiting pullover of the shaft which does not add manufacturing cost of the compressor.

The illustrated embodiment of the invention, designed to accomplish these and additional objects which will become apparent hereinafter, comprises a hermetic compressor including a hermetic casing having a tubular side wall and an end wall and a motor compressor unit within the casing. The motor compressor unit comprises a motor stator component and a compressor component which are respectively rigidly supported on the tubular side wall. The compressor component includes a frame having a main bearing and a shaft journalled in the bearing. The shaft includes an overhanging portion extending through the stator and having a motor rotor mounted thereon within the stator component. In order to limit lateral movement of the rotor relative to the stator, there is provided a bushing mounted on the casing end wall for receiving the outer end of the shaft. The clearance between the bushing and the end of the shaft is greater than the clearance of air gap between the shaft and the bearing but is less than the air gap or clearance between the rotor and the stator component. Thus the bushing acts as a stop to limit pullover of the shaft by unbalanced magnetic forces within the motor but does not function as a bearing in the normal operation of the compressor.

In accordance with a preferred method of manufacturing such a compressor, this bushing is mechanically secured to the end wall prior to assembly of the end wall to the tubular side wall portion of the casing by mechanical means permitting limited lateral movement of the bushing relative to the end wall. A layer of heat hardenable adhesive is placed between the bushing and the end wall. The bushing is positioned on the end wall at a point such that when the end wall is secured to the tubular side wall of the casing, the bushing will slip over the end of the shaft. The bushing is then positioned concentric with the axis of rotor of the shaft after which the heat hardenable resin adhesive is cured to permanently and rigidly bond the bushing to the casing end wall.

BRIEF DESCRIPTION OF THE DRAWING

In the accompanying drawing:
FIG. 1 is a vertical sectional view of a hermetic compressor incorporating the present invention;
FIG. 2 illustrates one step in the method of manufacturing the compressor of FIG. 1; and
FIG. 3 illustrates a subsequent step in the manufacture of the compressor.

DESCRIPTION OF THE PREFERRED EMBODIMENT

With reference to FIG. 1 of the drawing, there is shown a hermetic compressor comprising a casing 1 including a tubular side wall 2 and an end plate 3 which together with an end wall or cap 4 forms a hermetic housing or enclosure for a motor-compressor unit. This unit includes a motor stator component 5 rigidly secured as by brazing, welding or by a shrink fit within the upper or open end of the tubular side wall portion of the casing and a compressor component 6 including a frame member 7 which is also rigidly secured as by brazing or welding to the interior surface of the tubular side wall 2 below the stator component 5.

The compressor component 6 includes a main bearing 8 which supports a drive shaft 9 in a position extending longitudinally of the tubular side wall casing portion 2. The compressor component also includes a rotary compressor 10 below the bearing 8 which is operated by the shaft 9. A motor rotor 11 is keyed or otherwise secured to the upper and overhanging portion 12 of the shaft, that is the shaft portion above the bearing 8 and within the stator 5. The compressor component may also include a lower bearing 14 below the compressor 10 for journalling the lower end of the shaft 9.

Compressors containing the components thus far described are well known. In one method of assembling compressors of this type, the stator 5 is positioned within the tubular side wall 2 adjacent one end thereof that is adjacent the upper end as viewed in FIG. 1 of the drawing and is rigidly secured thereto. Thereafter the preassembled compressor component 6 is inserted through the other or lower end of the tubular side wall portion 2 to a point where the rotor 11 is operatively positioned within the stator 5. Three or more shims (not shown) are then spaced about the rotor and within the gap between the rotor and the stator to provide, as accurately as possible, a concentric positioning of the rotor within the stator or in other words an air gap concentric about the rotor. The compressor frame is then rigidly secured, as by brazing or welding, to the tubular casing side wall 2 after which the shims are removed from between the rotor and stator. The hermetic housing is completed by the addition of the plate 3 and the end wall or cap 4 to the opposite ends of the tubular member 2 and after these have been brazed or welded in place to form a hermetic casing, the unit is heated and evacuated to remove all traces of moisture and other volatiles prior to assembly of the unit in a refrigeration system.

For a number of reasons including the unequal expansion and contraction of the heated weld areas between the compressor component and the casing side walls, it is difficult to obtain a completely concentric air gap or space within the motor. This is particularly true of the portion of the air gap between the rotor and stator at the end of the rotor remote from the bearing 8.

As has been previously indicated, if the air gap is not concentric, unbalanced magnetic forces between the rotor and stator can result in a pullover force between the stator and rotor in the direction of the minimum air gap area. This force is inversely proportional to the thickness of the air gap in this area and if sufficiently large it may cause a movement of the overhung portion 12 of the shaft such that the rotor will rub on the stator during startup of the compressor or in an extreme case, actually cause the rotor to lock against the stator.

In accordance with the present invention means are provided which limit the pullover movement of the shaft 9 during periods when an unbalance of the magnetic forces is most effective but which does not act as a bearing for the shaft during normal operation of the compressor.

In the illustrated embodiment of the invention, this means comprises a cylindrical bushing 17 mounted on the inner surface 18 of the end wall or cap 4 in a position to receive the extreme end 19 of the shaft 9. The bushing has a bore diameter somewhat larger than the shaft diameter and substantially greater than the normal clearance between the shaft and the main bearing 8 so that during normal operation the shaft will not bear against the bushing. Thus, the bushing does not function as a journal bearing. However the clearance between the bushing bore and the shaft is also less than the motor air gap 16 so that the bushing can limit any magnetic pullover of the shaft to an amount which will not permit contact between the rotor and stator. For example, the clearance of the bushing bore over the shaft may be about 0.005 inch compared with a normal bearing clearance of 0.0005 inch and a stator-rotor air gap of 0.015 inch.

A preferred method of providing this feature comprises mechanically securing the bushing 17 to the end cap 4 by means providing limited lateral movement of the bushing with reference to the end cap so that when the end cap is placed in position on the tubular side wall member 2, the bushing will slip over the shaft end 19. Thereafter steps are taken to position the bushing concentric with the shaft end 19 and finally the bushing is rigidly secured to the end cap in this position.

In the illustrated embodiment of the invention, this is accomplished by means of a stud 20 provided on the inner surface 18 of the cap 4 and a central aperture or opening 22 in the base or end wall 21 of the bushing adapted to be loosely received on the stud 20. Before mounting the bushing 17 on the stud 20 a small amount of a heat hardenable adhesive is applied either to the end wall 21 of the bushing or to the inner surface of the end cap 4 adjacent the stud 20 as indicated by the numeral 23 in FIG. 2 of the drawing. A suitable adhesive for this purpose is an epoxy resin cement which can be heat cured to a solid state. The bushing 17 is mechanically held on the stud 20 by means of a speed nut 24 or equivalent resilient anchoring means designed to permit centering of the bushing 17 with reference to the shaft end 19 as the end cap 4 is positioned on the casing side wall 2. The clearance between the walls of the passage 22 and the stud 20 is sufficient to permit the necessary lateral movement of the bushing on the end wall 4 during this assembly step.

After the end cap 4 has been permanently secured to the remaining casing portion, there is effected a mechanical movement of the shaft sufficient to center the bushing relative to the shaft end, that is to provide a substantially uniform clearance between the bushing and the shaft. To this end, the compressor may be either vibrated in a manner such that the end of the shaft will flex or vibrate in all lateral directions a distance less than the desired air gap between the stator and rotor or, preferably, the motor is momentarily energized to rotate the shaft. During initial energization of the motor, magnetic pullover forces are effective. However after deenergization, these forces are no longer present so that during the period the shaft continues to rotate after deenergization of the motor, the bushing is centered or positioned relative to the path of rotation of the shaft under conditions of minimum pullover. In this position, it will limit pullover movement of the shaft without in itself functioning as a journal bearing for the shaft.

Thereafter either by the application of a localized heat to the bushing area of the end cap 4 as by means of an electric heater 26 or during the time that the compressor is in the heated evacuation oven, the heat hardened adhesive is cured to permanently and rigidly bond the bushing to the end cap 4. Since the bushing 17 then limits movement of the shaft 19 to that permitted by the clearance of the bushing bore, the rotor cannot move into contact with the stator under any conditions of operation of the compressor.

While there has been shown and described a specific embodiment of the persent invention, it will be understood that it is not limited thereto and it is intended by the appended claims to cover all such modifications as fall within the true spirit and scope of the invention.

What we claim as new and desire to secure by Letters Patent of the United States is:

1. A hermetic compressor comprising:
   a hermetic casing including a tubular side wall and an end wall;
   a motor-compressor unit housed within said casing and comprising a motor stator and a compressor component respectively rigidly supported on said tubular side wall, said compressor component including a frame having a main bearing and a shaft journalled in said bearing;
   said shaft including an overhanging portion having an end extending through said stator and having a motor rotor mounted thereon within said stator and spaced apart from said end of said overhanging portion of said shaft; and
   means for limiting lateral movement of said rotor relative to said stator comprising bushing means mounted on said end wall for receiving said end of said overhanging portion of said shaft, said bushing means and said end of said overhanging portion of said shaft having lateral clearance therebetween which is greater than that provided between said shaft and said bearing but less than that provided between said rotor and said stator.

2. The compressor of claim 1 in which said bushing means is joined to said end wall by means of a heat hardened adhesive material which is cured to its hardened state after said end of said overhanging portion of said shaft its positioned in said bushing means.

3. A hermetic compressor comprising:
   a hermetic casing including a tubular side wall and an end cap;
   a motor-compressor unit housed within said casing and comprising a motor stator and a compressor component each rigidly supported on said tubular side wall for operatively positioning said motor stator and compressor component relative to one another, said compressor component including a frame having a main bearing adjacent said stator and a shaft journalled in said bearing;

said shaft including an overhanging portion having an end extending through said stator and having a motor rotor mounted thereon within said stator and spaced apart from said end of said overhanging portion of said shaft; and means for limiting lateral movement of said rotor relative to said stator comprising a bushing mounted on said cap for receiving said end of said overhanging portion of said shaft, said bushing and said end of said overhanging portion of said shaft having lateral clearance therebetween which is greater than that provided between said shaft and said bearing but less than that provided between said rotor and stator of said motor whereby said bushing limits lateral movement of said rotor but does not normally function as a bearing for said shaft.

4. The method of assembling a hermetic compressor unit having a motor stator and a compressor component including a frame having a bearing therein and a shaft journalled in said bearing and including an overhanging portion having an end and having a motor rotor mounted on said overhanging portion of said shaft and spaced apart from said end of said overhanging portion of said shaft, said method comprising:

rigidly mounting said stator and said compressor component in a casing having an open end with said stator adjacent said open end and said rotor positioned within and laterally spaced apart from said stator to provide an air gap therebetween, securing to the inner surface of a cap for said open end of said casing, by mechanical means permitting limited lateral movement thereof relative to said cap and with a layer of heat hardenable adhesive therebetween, bushing means adapted to receive said end of said overhanging portion of said shaft and provide lateral clearance threbetween which is smaller than that provided for said air gap and greater than that provided between said shaft and said bearing;

placing said cap on said open end of said casing with said end of said overhanging portion of said shaft inserted into said bushing means and rigidly securing said cap to said casing;

effecting a mechanical movement of said end of said overhanging portion of said shaft adapted to laterally center said bushing means relative to said end of said overhanging portion of said shaft; and curing said heat hardenable adhesive to permanently secure said bushing means to said cap.

5. The method of claim 4 in which said mechanical movement comprises rotation of said shaft.

References Cited
UNITED STATES PATENTS

| | | | |
|---|---|---|---|
| 1,771,739 | 7/1930 | Wise | 29—470.7 |
| 2,318,786 | 5/1943 | Korte et al. | 310—157 |
| 2,943,782 | 7/1960 | McGregor | 230—58 |
| 3,208,804 | 9/1965 | Stenert et al. | 308—236 |
| 3,487,457 | 12/1969 | Drouard et al. | 310—89 |

CARLTON R. CROYLE, Primary Examiner

R. E. GLUCK, Assistant Examiner

U.S. Cl. X.R.

310—85; 29—470.7